United States Patent [19]

Bergman

[11] 3,959,500

[45] May 25, 1976

[54] PROCESS FOR BLENDED FOOD PRODUCT

[75] Inventor: Joseph Bergman, Woodland Hills, Calif.

[73] Assignee: Nagle, Spillman & Bergman, Inc., Los Angeles, Calif.

[22] Filed: Aug. 14, 1975

[21] Appl. No.: 604,849

[52] U.S. Cl. ............................... 426/104; 426/302; 426/615; 426/634; 426/656
[51] Int. Cl.² ............................................ A23L 1/20
[58] Field of Search ............ 426/104, 302, 615, 634, 426/650, 656, 518, 519, 802

[56] References Cited
UNITED STATES PATENTS

| | | | |
|---|---|---|---|
| 3,770,463 | 11/1973 | McSweeney et al. | 426/650 X |
| 3,840,677 | 10/1974 | Leidy et al. | 426/104 X |

FOREIGN PATENTS OR APPLICATIONS

| | | | |
|---|---|---|---|
| 4,619,574 | 6/1971 | Japan | 426/104 |

OTHER PUBLICATIONS

Ziemba, John, *Food Engineering*, Apr. 1966, p. 58–60.

*Primary Examiner*—Raymond N. Jones
*Assistant Examiner*—Ester L. Massung
*Attorney, Agent, or Firm*—Blakely, Sokoloff, Taylor & Zafman

[57] ABSTRACT

A process for the production of a uniformly blended textured vegetable protein food product including a mixture of dehydrated food granules containing specifically sized granules of a flavored textured soy protein. The dehydrated food particles including the flavored textured soy granules are mixed in a blender so as to blend the particles together into a uniform mixture. Dehydrated onion flakes of a specific size are then added and finally mixed with the previously blended food particles so as to blend all the particles together whereby oils from certain flavored soy granules (i.e. bacon) are coated on and absorbed by the onion flakes and other dehydrated vegetables and additives.

15 Claims, 1 Drawing Figure

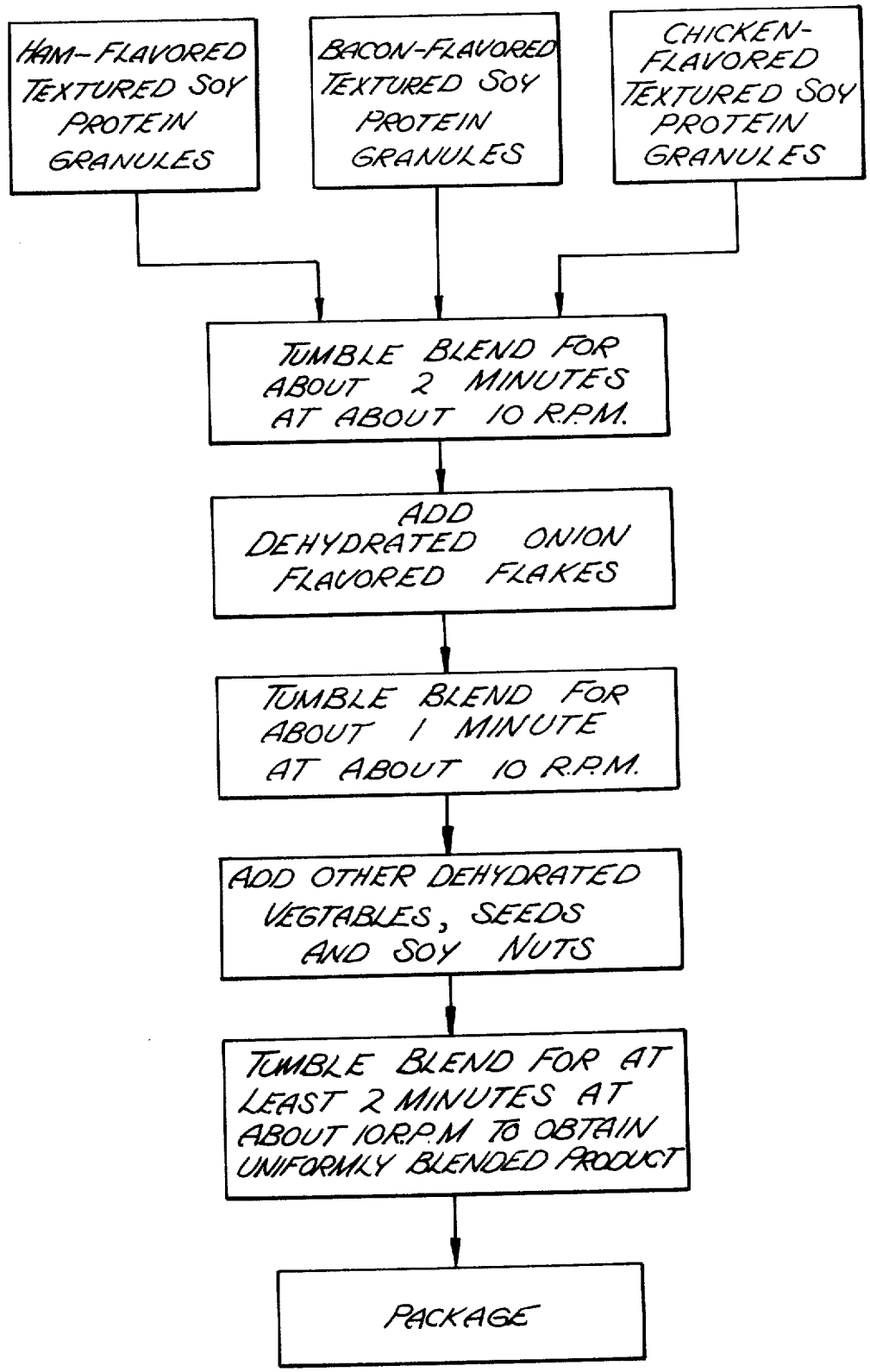

PROCESS FOR BLENDED FOOD PRODUCT

BACKGROUND OF THE INVENTION

1. Field of the Invention

The present invention relates to food products and more specifically, to a method for producing a uniformly blended food product containing meat and/or poultry flavored textured soy particles, dehydrated onion flakes and other dehydrated vegetables, fruits and dry ingredients such as nuts, sunflower seeds, etc.

2. Prior Art

The use of soy products as a food supplement or additive is known in the art. For example, soy protein ingredients have been used in rehydrated form as ingredients with other substances of pre-cooked, partially cooked, or ready-to-be-cooked foods. Soy flour in various forms (including textured soy proteins) have been associated with so called "proverty food" and used as meat extenders.

Applicant has discovered that flavored textured soy protein when blended with certain dehydrated vegetables, sunflower seeds and nuts provides a product which has a dehydrated food particles pleasing texture and flavor. To combine the various dehydrated food particles and seeds and/or nuts with the textured flavored soy protein in order to get the desired final product texture requires careful blending a specific order of mixing. Applicant has found that merely mixing the various ingredients together at high speed will often result in "fines" being produced. Fines are particles that have become so small in size and powdery in consistency that they are no longer recognizable as specific ingredients. Such fines are undersirable in a food product or additive for salads, soups, and the like, inasmuch as the desirable texture of the soy protein granules and the dehydrated food particles (e.g. vegetables, fruits, nuts, etc.) would be completely lost in the fines state. The term "texture" as it is used herein means that the size, composition, configuration, and consistency of the ingredients is such that the user associates such ingredients with the food and food flavors as they would normally appear in the actual food products simulated. In order to retain the desired texture and flavor it is necessary to blend the certain sized ingredients in a specific order and under specific conditions to obtain the novel and unique food product described herein.

Applicant has also discovered that by the use of the present blending method, natural oils and flavors which are impregnated in certain of the soy particles (such as bacon) are caused to be coated on and absorbed primarily by the dehydrated onion particles and to a lesser extent by the other dehydrated vegetables (e.g. carrots, green beans, etc.) and sunflower seeds or nuts. Thus, the onion particles and vegetables particles not only have their own flavor but also the flavor of the soy particles. This gives a salad the same type of taste as using fresh bacon bits, for example, with the bacon fat (or oils) being absorbed in or coated on the fresh vegetables.

BRIEF SUMMARY OF THE INVENTION

The present invention relates to a process for the production of a uniformly blended and uniquely flavored food product. The process includes the steps of:

a. providing a mixture of certain meat and poultry flavored textured soy protein granules (i.e. bacon, chicken and ham);

b. mixing the flavored soy protein granules in a tumble blender for about two minutes at a predetermined speed (e.g. about 10 RPM) so as to uniformly blend the protein particles together, whereby the soy protein particles are uniformly mixed without causing the particles to be converted into a powder or fines);

c. adding dehydrated onion flakes to the uniformly mixed soy protein particles;

d. mixing the onion flakes and the soy granules in a blender for about 1 minute at a predetermined speed (e.g. about 10 RPM) so as to uniformly blend them together such that ($i$) less than about 1% by weight of the soy granules and onion flakes are converted into powder; and ($ii$) the oil from the bacon-flavored soy granules is primarily coated on and absorbed by the onion flakes;

e. adding additional dehydrated food particles selected from the group consisting of dehydrated fruit, dehydrated vegetables, nuts, seeds and mixtures thereof; and f. tumble blending the additional food particles for at least about two minutes of about 10 RPM so as to produce the uniformly blended food product in which the remaining oil from the bacon flavored soy granules is coated and absorbed by the additional food particles.

Substantially all of the blended particles have a size nominally in the range of about 1/16 inch to 0.50 inch. By the use of the aforementioned process, all of the ingredients are uniformly mixed together to obtain a blended product having desired particle size, texture and flavor.

In addition to the desired texture, certain flavors and oils which have been used to flavor the soy particles (such as bacon oil), are absorbed by the dehydrated onion particles and other particles. This added flavoring to the dehydrated vegetables, seeds and nuts produces a uniquely flavored product which can be used as an additive to fresh tossed green salads, a snack to be eaten as is, and as an additive for ground meat dishes, casseroles, soups, stuffings, cottage cheese, sour cream, cooked vegetables, etc.

The novel features of the invention, both as to the product and method making such product, together with the further objectives and advantages thereof, will be better understood from the following description considered in connection with the accompanying drawing in which a presently preferred method of the invention is illustrated by way of example. It is to be expressly understood, however, that the drawing is for the purpose of illustration and description only and is not intended as a definition of the limits of the invention.

BRIEF DESCRIPTION OF THE DRAWING

The drawing contains a block diagram of the preferred process steps and ingredients used to produce a flavored and uniformly blended textured protein food product.

DETAILED DESCRIPTION OF THE INVENTION

In order to obtain a synergistic interaction of vegetable, meat, poultry and nut flavors and textures without destroying the characteristics of the individual textures of the ingredients, a process for blending the required ingredients in a specific order and time is necessary. First the flavored textured soy protein granules are placed in a suitable blender such as a Patterson-Kelly V-Shell Blender. Such blenders per se are known in the art. The particular blender used had a capacity of about 400 cubic feet. Each of the flavored soy food granules to be used in producing the desired textured food product is carefully placed in the blender in predetermined amounts. While various textured soy granules can be used, at least one of the flavored soy products should be bacon-flavored because the bacon oils used in flavoring the protein appear to be particularly useful in subsequent blending with the dehydrated onion and other dehydrated and dried food particles in order to obtain a product having similar taste to that achieved when using freshly prepared bacon bits. As is known in the art, flavoring of the soy granule is achieved by impregnating the soy particles with oils and flavorings of the desired food e.g. bacon, ham, chicken, etc. The methods to produce such textured flavored soy granules will not be set forth herein since they are conventional and known in the art. In the presenttly preferred embodiment, about 10 to 15 presently per cent by weight of the final food product produced should be bacon-flavored textured soy granules in order to obtain the desired flavor from the bacon flavored protein. The texturing of the soy protein allows the particles, when eaten, to appear to the consumer to be the particular fresh food which they are flavored to simulate. For example, bacon-flavored textured soy particles are produced to have the shape, color and feel in the mouth of little bits of bacon. The same would be true of the ham-flavored soy particles as well as the chicken-flavored soy particles. The flavored vegetable protein granules used were obtained from Archer Daniel Midland of Decatur, Illinois. Such granules were cylindrical having a diameter of 3/16 inch and die cut to ¼ inch lengths. In the preferred composition 10 to 15% chicken flavored vegetable protein granules and 20-30% ham flavored protein granules are utilized to obtain the desired flavor and the final product texture required for the purposes indicated above.

Next, the dehydrated onion flakes are added to the uniformly mixed soy protein particles. In the presently preferred embodiment, about twelve per cent to twenty per cent by weight of the final food product is dehydrated onion flakes. The onion flakes typically have a largest dimension size of from about ⅛ inch to ½ inch. This step involves the synergistic result of not obtaining an onion flavor in the final product, but also obtaining onion flakes which have a bacon flavor associated therewith as though fresh bacon and bacon oil were used. It has been found that if the dehydrated onion flakes are added to the other flavored protein granules before the bacon-flavored soy granules are blended, the oils and flavoring of the bacon soy particles will not be absorbed to the same extent on the onion flakes. The onion flakes should be allowed to absorb the greater amount of bacon oil than the other additives to obtain the desired flavor. Therefore, the onion flakes should be preferably added after the bacon flavored soy granules have been blended with the other soy protein ingredients and before the other ingredients are added.

After the onion flakes are added to the blended soy food particles, the resulting mixture is tumble-blended in the V-shell blender. This continues until flakes and the soy food particles are uniformly mixed together and at a speed and for a length of time such that (*i*) relatively few (less than 1% by weight) of the granules, particles and flakes used are converted into powder; and (*ii*) the oils from the bacon-flavored soy particles are coated on and absorbed first by the onion particles and then by the other additional ingredients to be subsequently added. In the presently preferred method, a blender speed of about 5–15 RPM is used for about one minute. Excellent results have been obtained at a 10 RPM blender speed for about one minute.

Following this mixing step, additional food particles and flakes (20 to 48% by weight) may be added as desired to enhance the taste. The additional food products may be selected from the group consisting of dehydrated vegetables, dehydrated fruits, nuts, seeds and mixtures thereof. These additional food particles are also tumble-blended with the onion flakes and soy particles for about two minutes. The food product produced by this method is uniformly blended and the particles retain substantially their initial particle size and shape. The onion flakes in particular which are heavily impregnated with bacon oil from the bacon-flavored textured soy particles give the final food product when used in a salad a realistic flavor similar to that achieved using fresh onions and bacon bits.

The resulting product is particularly useful as an additive to fresh tossed salads and the like. One of the major advantages of the instant invention is that in the dry dehydrated form, the product exhibits an unusual blend of pleasing textures and flavors which can be eaten as is or mixed with other foods e.g. ground meat, stuffings, etc.

Referring now to the drawing, there is shown the presently preferred method for making the invented food product. A preferred formula of ingredients used in the manufacture of the desired food product is as follows:

| | | Wt. % |
|---|---|---|
| 3/16" × 1/4" | granules of ham flavored textured soy protein | 25.0% |
| 3/16" × 1/4" | granules of chicken flavored textures soy protein | 12.2% |
| 3/16" × 1/4" | granules of bacon flavored textured soy protein | 12.2% |
| 1/4" × 1/2" | sliced green bean particles, dehydrated | 3.0% |
| 1/4" to 3/8" | tomatoes, flaked and dehydrated (max 5% through U.S.S. No. 8 Screen) | 5.0% |
| 1/16" × 3/8" | diced carrots, flaked or puffed, dehydrated (max 5% through U.S.S. No. 8 Screen) | 8.1% |
| 1/8" to 1/2" | onion flakes, dehydrated | 16.0% |
| | sunflower seeds, hulled, dry roasted | 10.0% |
| | soy nuts, halfed or quarted | 8.5% |
| | | 100.0% |

Initially, the ham-flavored texturized soy granules, chicken-flavored texturized soy granules, and bacon-flavored texturized soy granules are tumble-blended together in the Patterson-Kelly V-Shell blender for about two minutes. To this product is added the dehydrated onion-flavored flakes and the tumbling is continued for an additional minute. Then, dehydrated green beans, tomatoes, carrots, and sunflower seeds and soy nuts are added and the composition is continuously tumble-blended for at least another two minutes to obtain a uniformly blended product. It is to be understood, however, that other dehydrated vegetables or fruit particles, (e.g. figures, dates, etc.), seeds and/or nuts are also within the scope of the invention. The food product is then packaged in a conventional manner known in the trade. One preferred package is a thin film type bag which is transparent and allows the customer to see the blended ingredients. Such film bags are usually heat sealed after filling and are then impervious to moisture or air. Also such bags can be sized and configured to minimize the ingredients from separating on a weight basis in the package. The resulting product from the above-described method is a uniformly blended food product having an especially desirable texture which is palatable to consumers.

Because soy powders and the like have been used as poverty food and are usually marketed as meat extenders, there has not been a wide range of consumer acceptance to soy protein products. The present invention produces a synergistic interaction of flavors and textures without destroying the prepared characteristics and tastes of the individual flavored protein granules and other ingredients. This is accomplished by the aforementioned blending and mixing process which enables the flavored soy granules to be used in foods and in snacks in a way that is appealing to the consumer.

Although this invention has been disclosed and described with reference to a typical composition of food product, the principles involved are susceptible of other applications which will be apparent to persons skilled in the art. For example, other blending and mixing means in which the various ingredients are tumbled, will be apparent to persons skilled in the art so long as the ingredients are not ground into fines or a powder. Moreover, various optional ingredients other than those specifically set forth herein as necessary can be added so long as they have a suitable particle size and flavor, and are capable of being tumbled without being converted into a powder. However, to obtain the basic synergistic interaction of flavors described above, it has been found that bacon flavored textured soy protein granules and dehydrated onion flakes must be used and blended in the order and manner previously discussed prior to the addition of the other dehydrated vegetables, seeds, nuts, etc.

I claim:

1. A process for the production of a uniformly blended textured vegetable protein food product comprising the steps of:
   a. providing a mixture of flavored textured soy granules, said mixture including 10–15% by weight of bacon-flavored textured soy granules which contain bacon oil
   b. mixing the product resulting from step (a) in a blender so as to uniformly blend said textured soy granules together, said mixing taking place at a predetermined speed such that said food particles are uniformly mixed without causing said food particles to be converted into fines;
   c. adding about 12–20% by weight dehydrated onion flakes to said mixture; and
   d. mixing said onion flakes and said food particles so as to uniformly blend said food particles and said onion flakes together, said mixing taking place at a predetermined speed and for a predetermined length of time such that
      i. said onion flakes and soy granules substantially maintain their original particle size, and
      ii. oil from said bacon-flavored soy particles are allowed to be coated on and absorbed by said onion flakes.
   e. adding about 20–48% by weight of additional food particles to the mixture, said additional food particles consisting of dehydrated vegetables, dehydrated fruit, sunflower seeds, nuts and mixtures thereof.
   f. blending said additional food particles and said mixture to obtain a uniform mixture and to allow said oils from said bacon flavored particles to be coated and absorbed by said additional food particles.

2. The process according to claim 1 wherein said mixing takes place in a tumble blender.

3. The process according to claim 1 wherein said textured soy granules have a particle size inch. 1 wherein 3/16 inch in diameter and ¼ inch in length and said dehydrated onion flakes have a particle size of ⅛ inch to ½ inch.

4. The process according to claim 2 wherein said blender operates at about 5 to 15 RPM.

5. The process according to claim 4 wherein said blender mixes said food particles in step (b) for about two minutes prior to the addition of said dehydrated onion flakes.

6. The process according to claim 4 wherein said additional food particles are blended with said onion flakes and said textured soy granules for about one minute.

7. The process according to claim 5 wherein said additional food particles comprise dehydrated green beans, dehydrated tomato flakes, dehydrated carrot particles, hulled sunflower seeds and soy nuts.

8. The process according to claim 1 wherein said flavored textured soy protein granules include food granules selected from the group consisting of ham-flavored textured soy granules, chicken-flavored textured soy granules, and mixtures thereof.

9. A process for the production of a uniformly blended textured vegetable protein food product comprising the steps of:
   a. providing a mixture of flavored textured soy protein granules, said mixture including about 10 to 15% by weight of bacon flavored soy granules containing bacon oil, 20–30% by weight of ham-flavored soy granules, and 10–15% of chicken flavored soy granules;
   b. initially mixing said soy protein granules in a tumble blender so as to uniformly blend said granules together, said mixing taking place at a predetermined speed for about one minute whereby said soy granules are uniformly mixed without causing said particles to be converted into fines;
   c. adding about 12–20% by weight of dehydrated onion flakes to said uniformly mixed soy protein granules;
   d. mixing said onion flakes and said soy protein granules so as to uniformly blend said food particles and said onion flakes together, said mixing taking place at a predetermined speed and for about one minute such that the oils from said bacon-flavored soy granules are coated on and absorbed by said onion flakes;
   e. adding about 20–48% by weight additional food particles to said uniform mixture, said additional food particles selected from the group consisting of dehydrated vegetables, soy nuts, sunflower seeds and mixtures thereof; and
   f. tumble-blending said additional food particles with said mixture for at least about two minutes so as to produce said uniformly blended food product wherein substantially all of said blended particles have nominal particle sizes in the range of 1/1 inch to ½ inch.

10. The process according to claim 9 wherein said blender operates at about 10 RPM.

11. The process of claim 10 in which said additional food particles comprise dehydrated green beans, dehydrated tomato flakes, dehydrated carrot particles, hulled sunflower seeds and soy nuts.

12. A process for the production of a uniformly blended textured vegetable protein food product comprising the steps of:
   a. providing a mixture containing about 12.2% bacon oil flavored textured soy protein granules, about 12.2% chicken flavored textured soy protein granules, and about 25% ham flavored textured soy protein granules;
   b. mixing said soy protein products in a blender at a speed of about 10 RPM for about 2 minutes to obtain a uniform mixture;
   c. adding about 16% dehydrated onion flakes;
   d. mixing said onion flakes in a blender with said soy protein granules for about one minute at a speed of about 10 RPM;
   e. adding additional ingredients containing about 3% dehydrated green beans particles, about 5% dehydrated tomato particles, about 8.1% dehydrated carrot particles, about 10% hulled dry roasted sunflower seeds and about 8.5% soy nuts.
   f. mixing said soy protein granules, said dehydrated onions and said additional ingredients in a blender for at least two minutes at a speed of 10 RPM to obtain a uniformly final blended product.

13. A product made in accordance with the process of claim 1.

14. A product made in accordance with the process of claim 9.

15. A product made in accordance with the process of claim 12.

* * * * *